July 30, 1946.  J. P. VOLLRATH  2,405,075
PROTECTING TUBE
Filed Nov. 27, 1943
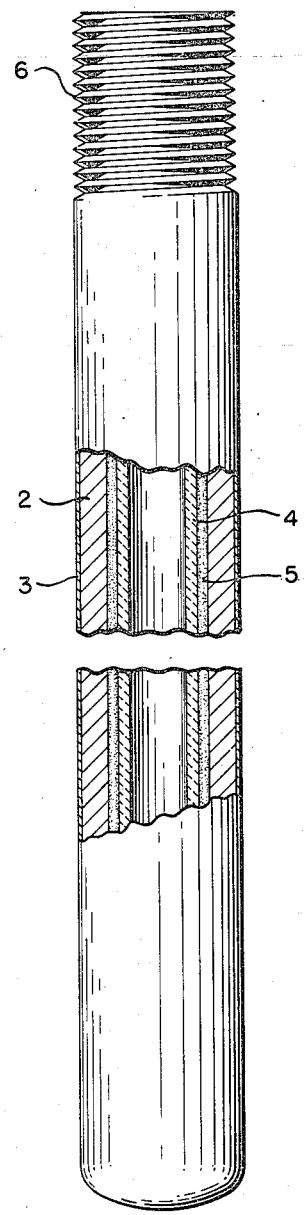
INVENTOR.
JOSEPH P. VOLLRATH
BY
ATTORNEY.

Patented July 30, 1946

2,405,075

UNITED STATES PATENT OFFICE 2,405,075

PROTECTING TUBE

Joseph P. Vollrath, Glenside, Pa., assignor to The Brown Instrument Company, Philadelphia, Pa., a corporation of Pennsylvania Application November 27, 1943, Serial No. 512,058

1 Claim. (Cl. 136—4)

The present invention relates to temperature measurement, and more particularly to a protecting tube which is used to protect a temperature measuring thermocouple.

It is customary in the measurement of temperatures by means of thermocouples to enclose the latter in a protecting tube. This is done for several reasons amongst which is to prevent contamination of the thermocouple and to increase its life. The protecting tube must have the characteristic of being unaffected by the medium which surrounds it and of rapidly transmitting heat from the process to the temperature responsive element. It has been particularly difficult to find a protecting tube that will satisfy these requirements when used in a molten salt bath of the carburizing type.

It is, accordingly, an object of this invention to provide a protecting tube for thermocouples which will withstand the action of carburizing baths, and particularly baths of cyanide salts, for a longer period than has heretofore been possible.

It is a further object of the invention to provide a protecting tube for thermocouples which will permit the rapid transfer of heat from its exterior to a thermocouple located in the same, and with a minimum thermal lag.

It is a further object of the invention to provide the combination of a carburizing bath with a protecting tube of the type disclosed herein.

The various features of novelty which characterize this invention are pointed out with particularity in the claim annexed to and forming a part of this specification. For a better understanding of the invention, however, its advantages and specific objects obtained with its use, reference should be had to the accompanying drawing and descriptive matter in which is illustrated and described a preferred embodiment of the invention.

In the drawing the single figure shows a protecting tube made in accordance with the present invention.

The protecting tube is made of a plurality of parts each of which has its own characteristics and serves a definite purpose. As shown in the drawing the outer portion of the protecting tube is formed of a closed end metal tube 2 that is made of mild steel. This tube is covered with a thin layer of chromium 3 which may be deposited thereon in any suitable manner such as electroplating. A tube of this type when properly heat treated will withstand the action of molten cyanide salts which are used for carburizing baths.

When a thermocouple such, for example, as chromel-alumel is used in a metal tube containing iron, at temperatures above 1500° F., the wires thereof change their composition for some reason not at present known. It is thought however that this change in composition may be due to the fact that the atmosphere within the tube is oxygen free. Above 1500° F. the iron in the metal tube will combine with the oxygen of the air in the tube to form an iron oxide. The remaining constituents of the air, or the iron oxide, with the heat cause a change in the composition of the thermocouple wires, with a consequent change in the thermocouple calibration.

In order to avoid this change in thermocouple calibration, a gas impervious ceramic tube 4 is inserted within the metal tube 2. The thermocouple to be used is inserted in this ceramic tube. The tube 4 is preferably made of a fine grain vitrified ceramic material which is known as sillimanite and which has the chemical composition of $Al_2SiO_5$. A tube of this type will not permit the passage of gases through it at the temperatures that are encountered in a carburizing bath so that the atmosphere therein is normal. Such a tube, however, if immersed directly in the bath would be disintegrated by the action of the salts forming the same. Thus the ceramic tube 4 protects the thermocouple from the action of the atmosphere that is found in the interior of the metal tube 2, and the ceramic tube is protected from the action of the carburizing salt bath by metal tube 2.

Since the dead air space between the two tubes 2 and 4 will slow down the heat transfer from the exterior of the protecting tube to the thermocouple, the space between the two tubes is filled with a refractory material 5 which will rapidly transfer heat so that temperature changes to which the protecting tube is subjected will be more quickly reflected by the thermocouple than would otherwise be possible. A suitable refractory material has been found to be silicon carbide. This refractory material is powdered and is poured into the space between the metal and the ceramic tubes as shown in the drawing.

The upper end of the metal tube 2 is shown as being threaded at 6 so that any convenient type of support may be attached thereto. Such a support would also serve to hold the thermocouple wires so that they could be connected with a suitable pyrometer. It is noted that the protecting tube of the present invention can be used in other places than in carburizing salt baths although it is primarily intended for that purpose. Any desired type of thermocouple may be used in the protecting tube to measure the temperature thereof provided this thermocouple is suitable for the ranges of temperatures that are encountered.

While in accordance with the provisions of the statutes, I have illustrated and described the best form of this invention now known to me, it would be apparent to those skilled in the art that changes may be made in the form of the apparatus disclosed without departing from the spirit of this invention as set forth in the appended claim, and that in some cases certain features of this invention may sometimes be used to advantage without a corresponding use of other features.

Having now described this invention, what I claim as new and desire to secure by Letters Patent is:

A thermocouple protecting tube comprising an outer closed-end tube made of mild steel and covered with a thin layer of chromium, an inner closed-end tube received in telescoping relation by said outer tube and made of a fine grained, vitrified, gas impervious ceramic material, the space between said tubes being filled with a granular refractory material.

JOSEPH P. VOLLRATH.